(12) United States Patent
Duelli

(10) Patent No.: US 6,367,770 B1
(45) Date of Patent: Apr. 9, 2002

(54) VACUUM VALVE FOR SEPARATING TWO VACUUM CHAMBERS

(75) Inventor: Bernhard Duelli, Übersaxen (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 09/533,476

(22) Filed: Mar. 23, 2000

(51) Int. Cl.$^7$ ............................ F16K 25/02; F16K 3/18
(52) U.S. Cl. ........................................ 251/175; 251/327
(58) Field of Search .......................... 251/326, 327, 251/328, 329, 175, 193

(56) References Cited

U.S. PATENT DOCUMENTS

| | | | | |
|---|---|---|---|---|
| 2,194,261 A | * | 3/1940 | Allen | 251/328 |
| 4,548,386 A | * | 10/1985 | Gladisch et al. | 251/327 |
| 4,921,213 A | * | 5/1990 | Geiser | 251/328 |
| 5,003,943 A | * | 4/1991 | Lafferty et al. | 251/326 X |

* cited by examiner

Primary Examiner—Kevin Shaver
Assistant Examiner—Eric Keasel
(74) Attorney, Agent, or Firm—Sidley Austin Brown & Wood, LLP

(57) ABSTRACT

A vacuum valve for separating two vacuum chambers and including a valve body having an opening and a valve seat having two sealing surfaces encompassing the valve opening, and a valve slide including a closing member displaceable transverse displaceable transverse to the flow direction of the valve, which is defined by the axial direction of the valve body opening, and having two wedge-shaped, tapering toward each other side surfaces, with the slide further including, elastomeric, circumferentially closed seals provided on the side surfaces of the closing member, and with respective sealing surfaces of the valve seat and respective side surfaces of the closing member extending parallel to each other and forming, over their entire extent, with flow direction of the valve, an angle greater than 45°.

7 Claims, 4 Drawing Sheets

VACUUM VALVE FOR SEPARATING TWO VACUUM CHAMBERS

BACKGROUND OF THE INVENTION

1. Field of the Invention

The present invention relates to a vacuum valve for separating vacuum chambers. In particular the present invention relates to a vacuum valve including a valve body with a valve seat and a valve slide the closing member of which is provided with an elastomeric circumferentially closed seal which, in the closed condition of the vacuum valve, engages the sealing surface of the valve seat.

2. Description of the Prior Art

A vacuum valve for separating two vacuum chambers should meet different requirements than, e.g., a gas inlet valve or a valve provided between a vacuum chamber and a pump. The vacuum valve arranged between or separating two vacuum chambers is sometimes called a transfer valve. It should have a large through-opening, be able to be open or closed relatively quick, be suitable for a large number of openings and closings, and be suitable for application of a pressure difference to both of its sides. It is not necessary for the transfer valve to be able to open under application of a pressure difference thereto, though this is usual the case in many of conventional transfer valves. For opening the valve, both chambers can be brought under vacuum or, alternatively, both chambers can be flooded. If the possibility of a transfer valve to open, when one chamber is under vacuum and another chamber is flooded, is eliminated, the danger of operating errors is substantially reduced.

In vacuum valves with valve slides provided with elastomeric seals, it should be insured, during the displacement of the closing member into the valve closed position, that the seal is not stressed transverse to its longitudinal direction at the moment it contacts the sealing surface. The shear stresses acting on the seal secured on the closing member cause movement of the closing member transverse to the sealing surface, adversely affecting the function of the vacuum valve. Inevitable unevenness of the sealing surfaces, even when located in a microscopically small region, adversely affect sealing, resulting in that the slide, as applicable to vacuum technology, is not sealed any more. Microscopically small openings between the sealed from each other spaces are "holes" the size of which can exceed the size of gas molecules in several times.

In vacuum technology, the valve slide is so designed that the closing member, when moving into the closed position, is displaced substantially transverse to the sealing surface of the valve seat. E.g., German Publication DE 31 30 653A1 discloses a valve slide in which sealing plates, after the closing member has been displaced into its closed position, are pressed against the seals on the sealing surfaces by a toggle lever. Similar construction are also disclosed in German Publication DE 29 04 248 and in U.S. Pat. No. 3,262,672.

In another type of vacuum valves with valve slides, the sealing surfaces and the surfaces on which elastomeric seals are provided have a three-dimensional shape formed in such a way that upon displacement of the closing member into the closed position, no shear loads act on the elastomeric seal. The forces, which are applied to the seal, act either substantially in the direction transverse to the sealing surface or have also a force component acting in the longitudinal direction of the seal. By eliminating action on an elastomeric seal of forces, which cause a shear loading of the seal, during the closing displacement of the closing member, the distortion of the seal during a closing step is prevented to a most possible extent. This type of a vacuum valve with a valve slide is disclosed in German Publications DE 38 31 249A1 and DE 37 17 724 A1, German Patents Nos. 3,801,998; 3,831,249; and British Publication No. 2,045,898. In all of the vacuum valves disclosed in the above-listed Publications, a section of the seal lies on the front, viewed in the direction of the closing movement of the closing member, end section of the closing member. For sealing the valve, it is only necessary to apply a sealing force sufficient to deform the elastomeric seal. Usually, the applied sealing force amounts to at least 3 kg/cm with reference to a longitudinal extent of the circumferentially closed seal.

Transfer valves are used, e.g., in vacuum process plants or apparatuses used in semi-conductor industry. Such plants or apparatuses include, usually, a central handling chamber, in which a wafer is brought, and which is associated with different process chambers. In process chambers, the wafer is subjected to different processes during which process gases are pumped into or out of the process chambers. The process gases act on the elastomeric seals of the transfer valve, and the elastomeric seals, because of this, need be replaced from time to time. It was observed that the greater the elastomeric seals are subjected to the action of the process gases the stronger they become compressed.

Under normal operational conditions, a relatively small pressure difference exists between the central handling chamber and separate process chambers. In case of an accident or during cleaning of a process chamber, the transfer valve should be sealed against atmosphere.

Accordingly, an object of the present invention is to provide a transfer or vacuum valve with elastomeric seals suitable for use in an aggressive environment and having a longer service life than the conventionally used vacuum or transfer valves.

Another object of the present invention is to provide a transfer or vacuum valve which would not open under a pressure difference when only one side of the valve is subjected to vacuum.

A still further object of the present invention is to provide a transfer or vacuum valve that requires a small closing force for closing the valve.

SUMMARY OF THE INVENTION

These and other objects of the present invention, which will become apparent hereinafter, are achieved by providing a vacuum valve including a valve body having an opening an axial direction of which defines a flow direction of the valve, and a valve seat having two sealing surfaces encompassing the valve opening. The vacuum valve further includes a valve slide including a closing member displaceable transverse to the flow direction of the valve and having two wedge-shaped, tapering toward each other side surfaces, and elastomeric, circumferentially closed seals provided on the side surfaces of the closing member. Respective sealing surfaces of the valve seat and respective side surfaces of the closing member extend parallel to each other and form, over their entire extent, with the flow direction of the valve an angle greater than 45°.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
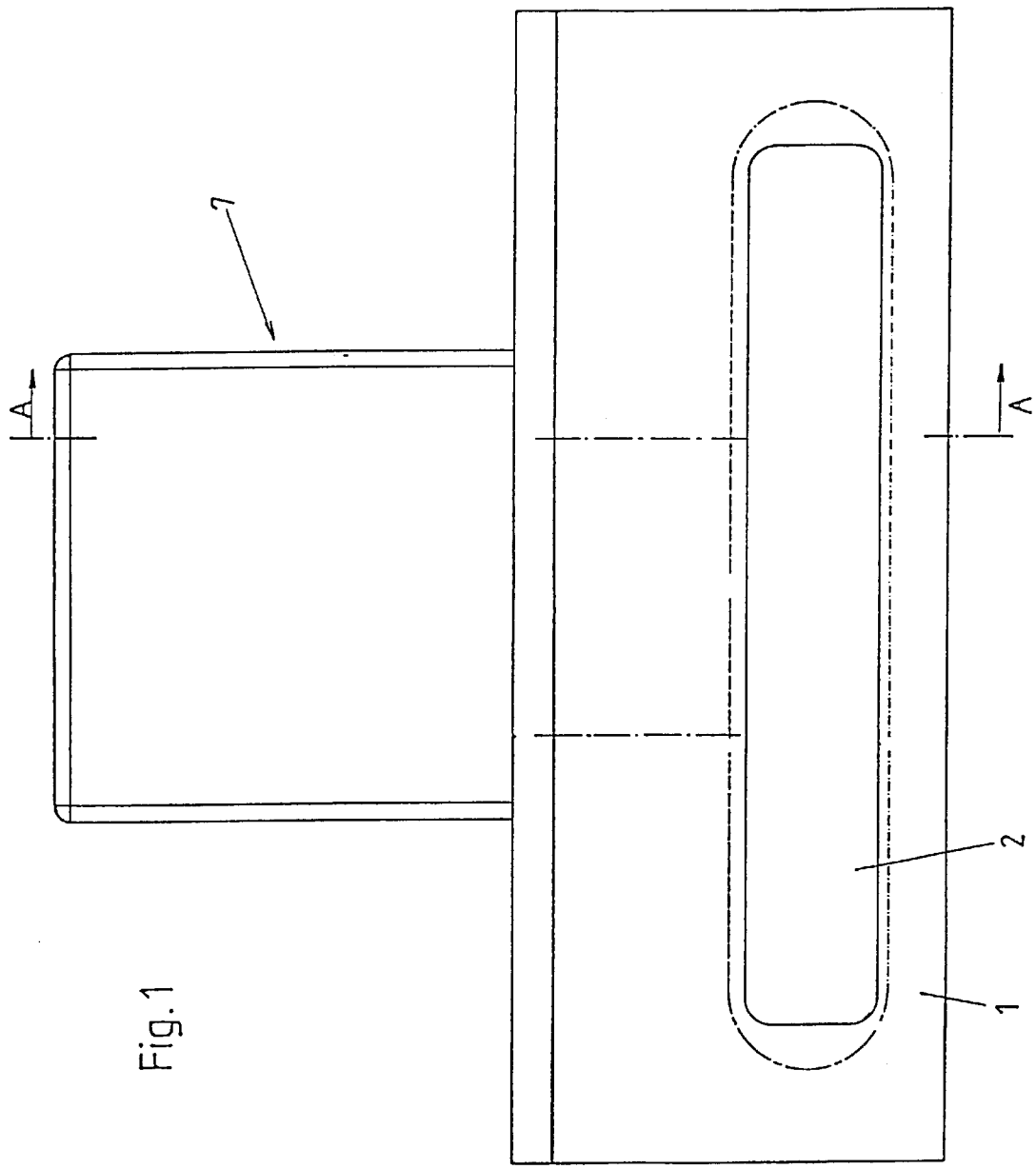
FIG. 1 a front view of a vacuum valve according to the present invention.
Figure 2:
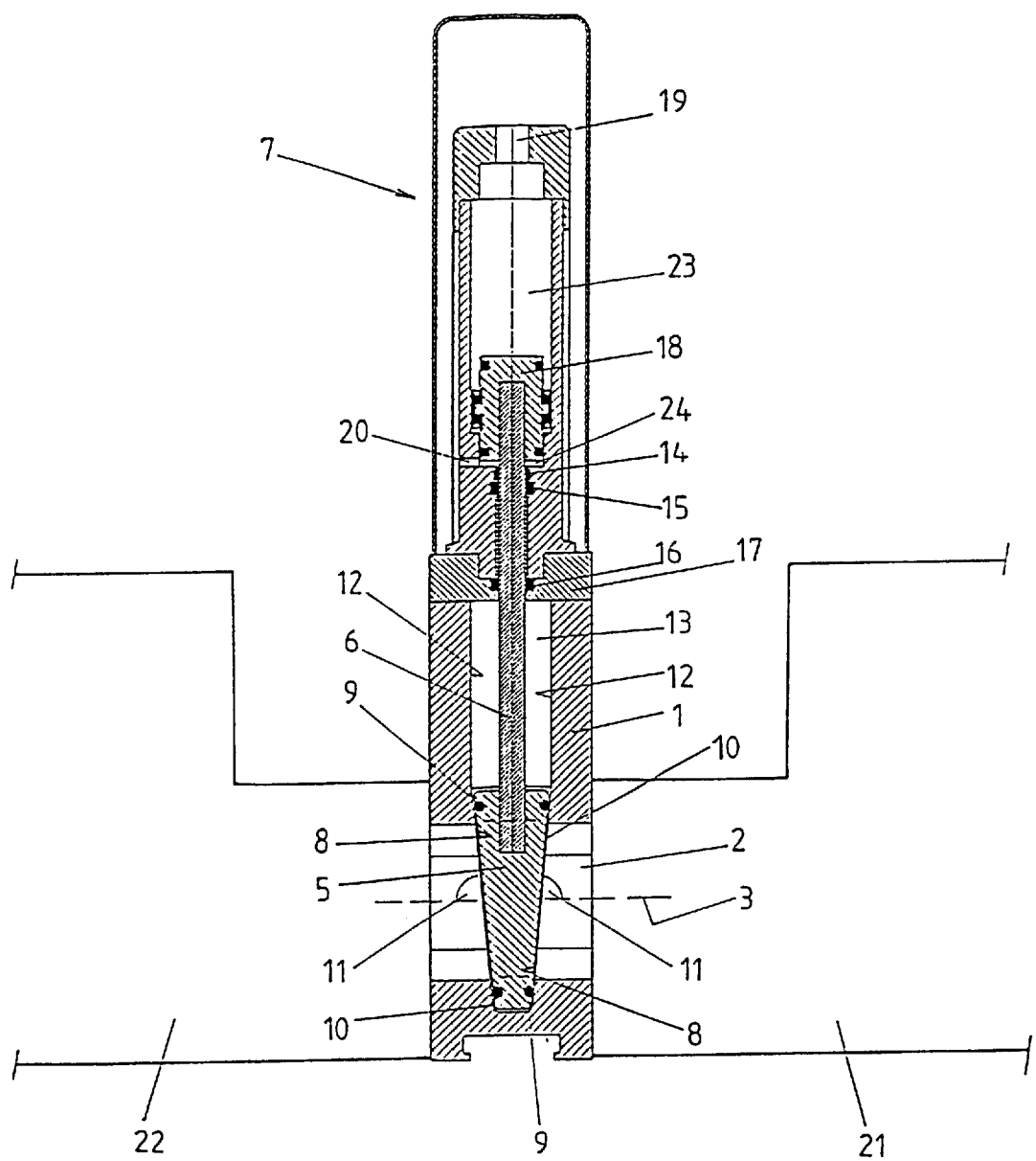
FIG. 2 a cross-sectional view of the vacuum valve according to the present invention along line A—A in FIG. 1.
Figure 3:
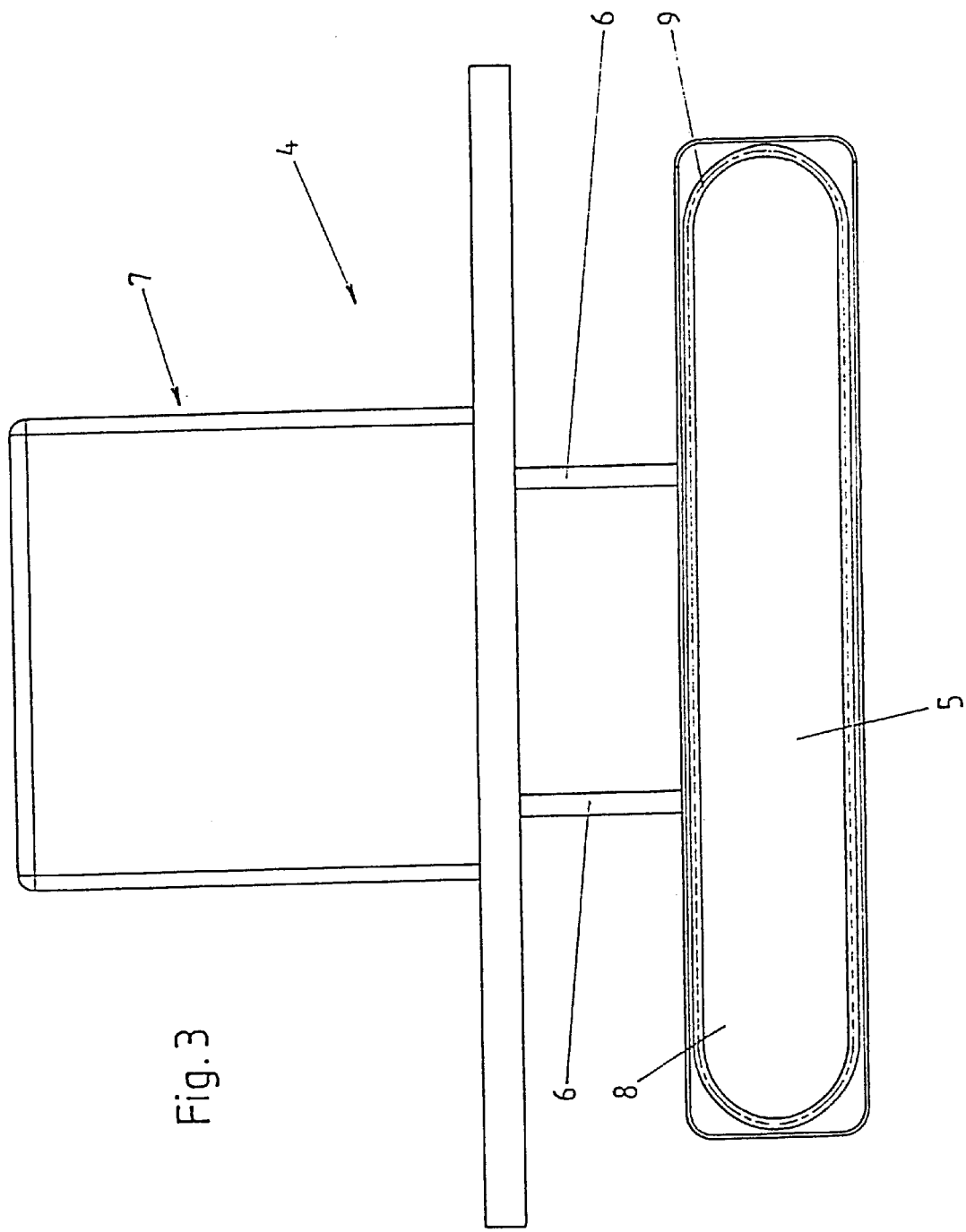
FIG. 3 a front view of a valve slide of the vacuum valve according to the present invention.
Figure 4:
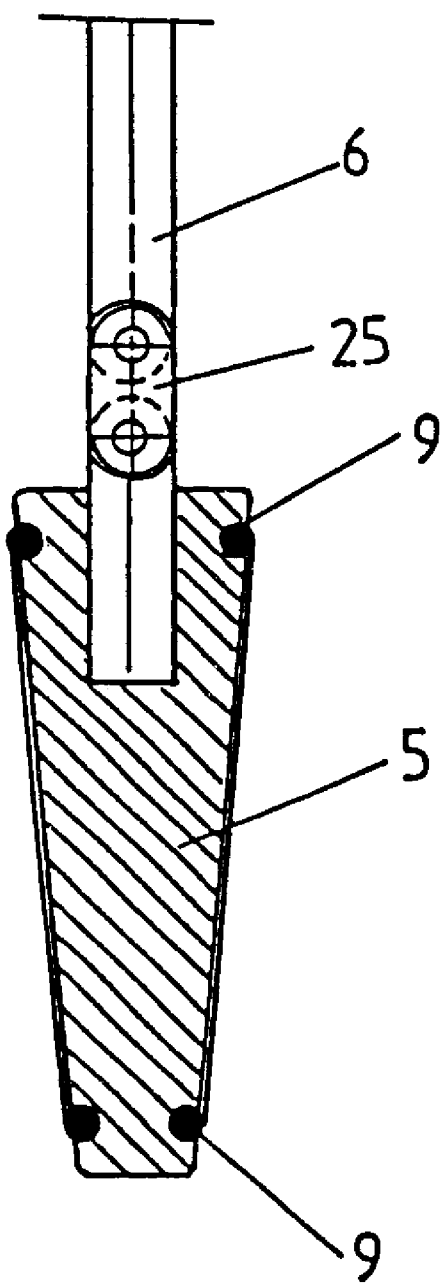
FIG. 4 a partial cross-sectional view of another embodiment of a valve slide of the vacuum valve according to the present invention.

A vacuum valve according to the present invention, which is shown in the drawings, is generally being mounted between two vacuum chambers 21, 22 which are shown schematically in FIG. 2. The vacuum valve has a vacuum body having a vacuum opening 2 the axial direction 3 of which defines a flow direction of the valve. The valve includes a valve slide 4 having a closing member 5 and two spars 6. Each spar has 6 two opposite ends, one of which is connected with the closing member 5 and the other opposite end of which is connected to an actuation member 7. The actuation member 7 displaces the closing member 5 between its open and closed positions. As shown in the front view shown in the drawings, the valve opening 2 and the closing member 5 have a rectangular shape.

The closing member 5 has two wedge-shaped, tapering toward each other side surfaces 8 carrying circumferential elastomeric seals 9 which, in the closed position of the valve, engage the sealing surfaces 10 of the valve seat. The sealing surfaces 10 and the corresponding side surfaces 8 of the closing member 5 extend parallel to each other. The side surfaces 8 form, respectively, with the flow direction of the valve an angle 11 of more than 45°. Advantageously, the angle 11 exceeds 75°, as shown in FIG. 2.

The valve body 1, in its region above the valve seat region with the sealing surfaces 10, has a region defined by spaced parallel surfaces 12 which enclosed a cuboid-shaped hollow space 13. In the open position of the valve, the closing member 5 is located in the hollow space 13.

The actuation member 7 is formed in a conventional, for vacuum valves with a valve slide, manner. Each of the spars 6 is associated with a corresponding piston-cylinder unit. Each piston-cylinder unit has a double-action piston 18 displaceable in opposite directions upon delivery of a pressure fluid in respective cylindrical chambers 23, 24 through respective conduits 19 and 20. For sealing the hollow space 13 from the adjacent chambers of the respective piston-cylinder units, there are provided sealing rings 14, 15 and 16. Basically, in addition to the sealing rings 14, 15, 16 or replacing them, completely or partially, a bellow can be provided that is welded, on one hand, to a flange 17 and, on the other hand, to respective spar 6, sealing the hollow space 13.

The actuation member 7 includes pneumatic piston-cylinder units. However, the actuation member 7 can, e.g., include linear motors or spindle drives, or be formed with hydraulic piston-cylinder units.

Contrary to the conventional vacuum valves with a valve slide, in the vacuum valve according to the present invention, only a small closing force is applied to the closing member 5 for closing the valve. This closing force amounts to less than 0.7 kg/cm, with reference to the length of the circumferential seal 9. Advantageously, the closing force amounts to less than 0.4 kg/cm. The small closing force, with the disclosed actuation member 7, is achieved by a proper dimensioning of the piston 18. In addition, a pressure reducer can be used, in particular, when the air pressure is too unsteady to provide a sufficiently uniform and low closing force at existing pressure ratios.

With reduced closing forces, the seals 9 would engage the sealing surfaces 10, practically, without any deformation of the seals 9, while providing a sufficient sealing of the valve. The achieved sealing is sufficient for conducting in the vacuum chambers 21, 22, which are, as discussed, schematically shown in FIG. 2, a process with a process gas under conventional, in semi-conductor industry, conditions, with the chambers 21, 22 being adequately sealed from each other. A pressure, during a certain process, can reach $5 \times 10^{-3}$ mbar. With the process being terminated, the process gas is pumped out. The pressure can increase, e.g., to $1 \times 10^{-1}$ mbar as a result of admission of nitrogen. Finally, the transfer (vacuum) valve is opened for removing of a treated wafer and for placing a new wafer. The transfer valve is closed again, and the process starts anew.

In case of an accident, an overflow in one of the chambers 21, 22, which are separated by the vacuum valve, can occur. In this case, it should be insured that the vacuum or transfer valve reliably seals the non-overflown chamber from the atmospheric pressure in the overflown chamber. Furthermore, from time to time, a control flooding of a process chamber in order to clean it takes place. When in the closed position of the valve, atmospheric pressure acts on one side of the closing member 5, with the other side being subjected to vacuum (with pressure of 100 mbar or less), the pressure difference presses the closing member 5 against the sealing surfaces 10 of the vacuum slide. This results in deformation of the sealing ring 14. The pressure difference generates a certain pressure-on force that, thus, insures sealing against atmospheric pressure. The pressure difference acts substantially uniformly on all of the regions of the seal 9, because the side surfaces 8 of the closing member 5 and the sealing surfaces 10 form, over their entire extent, with the flow cross-section in the axial direction 3 of the valve an angle larger than 45°, preferably, larger than 75°. As a result of the pressure difference acting thereon, the closing member 5 is displaceable, to a certain extent, in the axial direction 3 of the valve opening 2. To this end, the spars 6 are provided with a certain elastic deformability so that they form a kind of a flexor It is also possible in incorporate in each spar 6 a mechanical articulation or hinge 25.

With the use of the vacuum valve according to the present invention in an apparatus or plant used in the semi-conductor technology, during the closed condition of the valve when a process with the use of a process gas takes place in one of the chambers and at which the pressure difference between the separated chambers is small, no noticeable deformation of the elastomeric seals occur. Because of this a noticeable increase of the service life of seals is achieved, in particular, when aggressive process gases, which act on the tensioned seals, are used. In case of an accident or in case of flooding of a process chamber to clean it, a high pressure difference acts on the closing member 5. As a result, the seals compressed, and the valve becomes sealed against this high pressure difference. Opening of the closing member, at this high pressure difference, is not possible also because the closing member is designed for operation at which it is subjected to small closing or opening forces.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A vacuum transfer valve for separating two vacuum chambers, comprising:

a valve body having an opening, an axial direction of which defines a flow direction of the valve, and a wedge-shaped valve seat having two sealing surfaces encompassing the valve opening;

a valve slide including a wedge-shaped closing member side surfaces of which extend parallel to respective sealing surfaces of the valve seat of the valve body and form with the flow direction of the valve an angle greater than 45°, and two, spaced from each other, circumferentially closed seals provided on the side surfaces of the closing member, the closing member having an open position, a first closing position, in which the seals remain substantially undeformed, and a second closing position in which at least one seal is deformed; and an actuation member for displacing the closing member transverse to the flow direction into the first closing position thereof, the actuation member being designed for applying a closing force of less than 0.7 kg/cm with reference to a length of a seal, wherein the closing member is displaced from the first closing position thereof into the second closing position thereof under a pressure difference between the two, separated by the valve, chambers, with a pressure in one of the chambers being no more than 100 mbar and with another of the chambers being flooded.

2. A vacuum transfer valve as set forth in claim 1 wherein the actuation member is designed for applying a closing force of less than 0.4 kg/cm.

3. A vacuum transfer valve as set forth in claim 1, wherein the sealing surfaces of the valve seat and the side surfaces of the closing member form, with the flow direction of the valve, an angle greater than 75°.

4. A vacuum transfer valve as set forth in claim 1, wherein the sealing surfaces of the valve seat and the side surfaces of the closing member are flat.

5. A vacuum transfer valve as set forth in claim 1, further comprising at least one spar for displacing the closing member and having one end thereof connected with the closing member and an opposite end thereof connected to an actuation member for displacing the closing member between the open and the first closed positions of the closing member.

6. A vacuum transfer valve as set forth in claim 5, wherein the at least one spar is formed as a flexor having a sufficient elastic deformability for pressing the closing member against a corresponding sealing surface for deforming the seal upon action of the pressure difference between the two chambers on the closing member in the closed condition of the valve.

7. A vacuum transfer valve as set forth in claim 5, wherein the at least one spar includes a hinge.

* * * * *